United States Patent [19]

Pierce

[11] Patent Number: 5,143,351

[45] Date of Patent: Sep. 1, 1992

[54] SELF-LOCKING VALVE SPRING RETAINER

[76] Inventor: Daniel H. Pierce, 1330 Lyonhurst Rd., Birmingham, Mich. 48009

[21] Appl. No.: 751,735

[22] Filed: Aug. 29, 1991

[51] Int. Cl.⁵ .............................................. F01L 3/10
[52] U.S. Cl. .................................. 251/337; 123/90.67
[58] Field of Search ................ 251/337; 123/90.67, 123/90.66, 90.65, 188 SC; 267/1

[56] References Cited

U.S. PATENT DOCUMENTS

| | | | |
|---|---|---|---|
| 3,273,856 | 9/1966 | Tauschek | 251/337 |
| 3,416,771 | 12/1968 | Updike | 251/337 |
| 3,466,009 | 9/1969 | Giles | 251/337 |
| 3,612,016 | 10/1971 | Jeken | 123/90.67 |
| 4,515,346 | 5/1985 | Gaterman, III | 251/337 |
| 4,879,978 | 11/1989 | Pierce | 123/90.67 |

FOREIGN PATENT DOCUMENTS 959422 2/1957 Fed. Rep. of Germany ...... 251/337

Primary Examiner—Martin P. Schwadron
Assistant Examiner—Kevin L. Lee
Attorney, Agent, or Firm—Reising, Ethington, Barnard, Perry & Milton

[57] ABSTRACT

A self-locking valve spring retainer (30) operatively retaining a return spring (28) on the stem (20) of a poppet valve (16) comprises an annular base ring (48) from which three flexible arms (52) upwardly extend. A pair of axially spaced locking steps (66, 68) project radially inwardly from each of the arms (52) to provide barbed engaging ledges (74, 76) which interlock with a correspondingly shaped valve stem (20). An annular waisted hinge (86) is formed between the three arms (52) and the base ring (48) to ease stresses on the retainer (30) as the arms (52) are blossomed outwardly during installation and removal. A metallic anti-wear plate (88) is secured to the top of each arm (52). An installation and removal tool (92) for the retainer (30) comprises three wedge-shaped prongs (98) insertable within the three expansion slots (54) separating the three arms (52) for blossoming the retainer (30) prior to insertion and removal. A member (102) extends integrally from each of the prongs (98) for engaging the return spring (28) to maintain the return spring (28) spaced from the retainer (30) prior to blossoming the retainer (30).

15 Claims, 5 Drawing Sheets

SELF-LOCKING VALVE SPRING RETAINER

TECHNICAL FIELD

The subject invention relates to a self-locking valve spring retainer for operatively retaining a return spring on the stem of a poppet valve and to a handling tool for removing and installing a self-locking valve spring retainer clamped on a poppet valve stem by the assistance of a return spring.

BACKGROUND ART

Valve spring retainers are used in internal combustion engines to operatively retain a return spring on the stem of a poppet valve. Self-locking valve spring retainers are known in the art wherein the retainer automatically locks on the stem of the poppet valve as the retainer is pressed onto the valve stem. Self-locking valve spring retainers are advantageous in that they are easily installed in one quick motion by pressing onto the valve stem.

Examples of self-locking valve spring retainers may be had in U.S. Pat. No. 4,879,978 to Pierce, the inventor of the subject invention, issued Nov. 14, 1989, U.S. Pat. No. 3,273,856 to Tauschek, issued Sep. 20, 1966, and U.S. Pat. No. 3,612,016 to Jeken, issued Oct. 12, 1971. These references all disclose self-locking valve spring retainers for operatively retaining a return spring on the stem of a poppet valve. All three of the references disclose an annular base ring, which in Tauschek is discontinuous, and a plurality of arms extending in cantilever fashion from the base ring for flexing as the retainer is pressed over the end of the valve stem to an operative position. A self-locking means extends from each of the flexible arms for automatically engaging and gripping the valve stem when in the operative position.

However, the prior art is deficient in that as the retainer is pressed over the end of the valve stem with the arms flexing prior to engagement of the self-locking means on the valve stem, significant stresses are created in the base ring which leads to cracking and premature failure, especially in cold weather due to the increased brittleness of the retainer. Also, such damaging stresses in the base ring will prevent the retainer from being reused if ever removed for servicing reasons. Also, the valve spring retainers of the prior art are deficient in that the self-locking means includes only one locking step per arm for engaging and interlocking with a single mating projection of the valve stem. Hence, all of the shear stresses between the valve stem and the retainer are transferred through one locking step per arm.

Additionally, the self-locking valve spring retainers are difficult to remove from the valve stem because the force of the return spring causes the retainer to more tightly clamp onto the poppet valve stem. Hence, any effort to flex the arms outwardly to disengage the self-locking means becomes a battle against the return spring instead of simply against the elasticity of the retainer.

SUMMARY OF THE INVENTION AND ADVANTAGES

The subject invention comprises a self-locking valve spring retainer for operatively retaining a return spring on the stem of a poppet valve. The subject retainer comprises an annular base ring for surrounding a valve stem, a plurality of arms extending in cantilever fashion from the base ring for flexing outwardly from the base ring as the retainer is pressed over the end of the valve stem to an operative position, and a self-locking means extending inwardly from each of the arms for automatically engaging and gripping the valve stem when in the operative position. The invention is characterized by a waisted hinge for establishing a definite hinge location between each of the arms and the base ring to thereby reduce stress in the base ring as the arms are flexed outwardly from the valve stem during installation and removal of the retainer.

According to another aspect of the subject invention, a self-locking valve spring retainer for operatively retaining a return spring on the stem of a poppet valve is characterized by the self-locking means comprising two axially spaced locking steps projecting radially inwardly from each of the arms for automatically engaging and interlocking with two mating projections of the valve stem to decrease the concentration of shear stresses within the retainer.

According to another aspect of the subject invention, a self-locking valve spring retainer is characterized by an anti-wear plate secured to one locking step on each of the arms and fabricated from a dissimilar and harder material than the locking steps for forming a durable interface between the valve stem and each of the locking steps to better distribute shear forces through the arms and thereby extend the operative life of the retainer.

And, according to yet another aspect of the subject invention, a handling tool for installing and removing a self-locking valve spring retainer clamped on a poppet valve stem by the assistance of a return spring comprises a guide body, release means extending from the guide body for unlocking the retainer from the valve stem, and characterized by a spring spacer means extending from the guide body for engaging the return spring and maintaining the return spring spaced from the retainer prior to the release means fully unlocking the retainer to prevent interference from the return spring and to permit rapid removal of the retainer from the valve stem.

The self-locking valve spring retainer of the subject invention provides superiorly flexible arms which, due to the waisted hinge, are much less prone to stress fracture both during cold weather installation when the retainer material is very brittle and also when the retainer is reused after servicing the engine. Additionally, the two axially spaced locking steps projecting from each of the arms substantially decrease the concentration of shear stresses within the retainer, and thereby provide increased longevity to the retainer. Additionally, anti-wear plates secured to the uppermost locking steps further extend the operative life of the retainer by forming a tough, durable surface between the valve stem and the retainer to better distribute the shear forces throughout the arms.

Further, the improved handling tool of the subject invention enables the subject retainer to be quickly and easily removed from the valve stem without damaging the retainer because the handling tool includes a spring spacer means which maintains the return spring spaced from the retainer before the release means fully unlocks the retainer so that the return spring will not interfere with the unlocking operation of the retainer.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
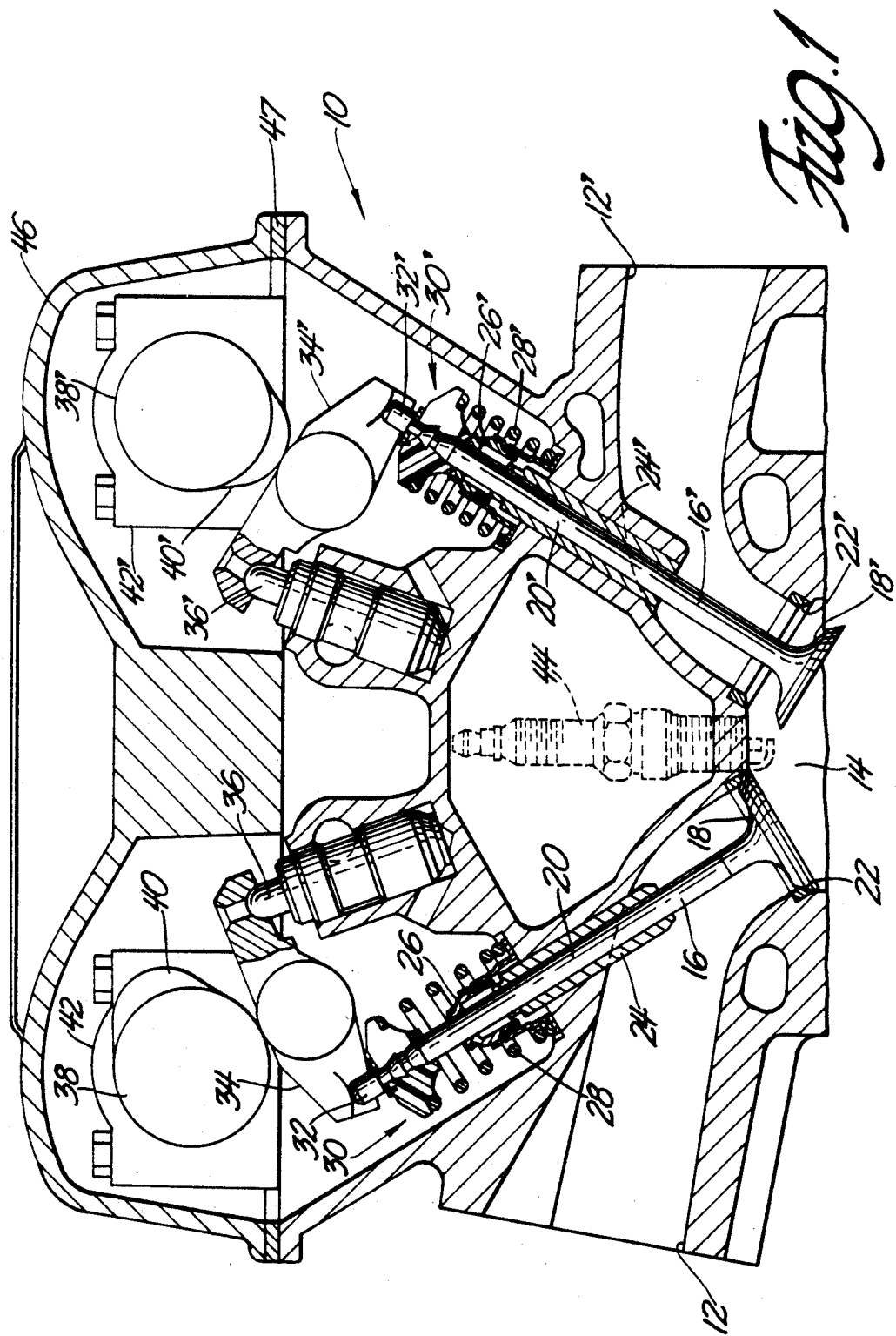
FIG. 1 is a cross-sectional view of a typical cylinder head for an internal combustion engine including dual overhead cams and a valve train incorporating the self-locking valve spring retainer according to the subject invention.

Referring to the Figures, wherein like numerals indicate like or corresponding parts throughout the several views, a cross-sectional view of a typical cylinder head is generally shown at 10 in FIG. 1. The cylinder head 10 is positioned over the combustion chamber (not shown) of an internal combustion engine for directing fuel and exhaust into and out of the combustion chamber. Accordingly, the cylinder head 10 includes an intake port 12 extending from an intake manifold (not shown) to the roof 14 of the combustion chamber. An intake valve, generally indicated at 16, includes a valve head 18 and a valve stem 20. The valve head 18 sealably engages and covers an intake valve seat 22 formed at the exit end of the intake port 12. The valve stem 20 is slideably supported in a valve guide 24, which in turn is fixedly pressed into the cylinder head 10. A guide end seal 26 covers the upper end of the valve guide 24 and engages the valve stem 20 in a boot-like manner for wiping oil from the valve stem 20 to prevent oil from collecting over the valve guide 24. A return spring 28 is disposed concentrically about the valve stem 20 and extends from a bottom flange on the guide end seal 26 to a self-locking valve spring retainer, generally indicated at 30. With the retainer 30 secured to the valve stem 20, the biasing force of the return spring 28, continuously urges the valve 16 upwardly into sealing engagement with the intake valve seat 22.

The valve stem 20 includes a top end 32 extending above the retainer 30 and presented for engagement by the free end of an oscillating rocker arm 34. The opposite end of the rocker arm 34 is supported in a fulcrum-like manner by a hydraulic valve lash adjustor 36. The valve lash adjustor 36 is rigidly supported in a dedicated recess of the cylinder head 10. A rotary cam shaft 38 having a lobe 40 extending therefrom is rotatably supported in a bearing 42 adjacent the rocker arm 34 so that upon engagement with the lobe 40, the rocker arm 34 is rotated about its fulcrum at the valve lash adjustor 36 to downwardly displace the valve 16 against the biasing force of the return spring 28. As the lobe 40 rotates away from the rocker arm 34, the return spring 28 urges the intake valve 16 back to the position shown in FIG. 1 with the head 18 perfecting a fluid-tight seal with the valve seat 22.

In a similar manner, an exhaust port 12' is provided and includes a valve seat 22' disposed at the entrance end thereof for engaging and perfecting a seal against the head 18' of an exhaust valve 16'. The exhaust valve 16' includes a stem 20' reciprocally supported in a valve guide 24'. A guide end seal 26' covers the upper end of the valve guide 24' and wipes oil from the valve stem 25. A compression type return spring 28' is concentrically disposed about the valve stem 20' and is operatively engaged therewith by way of a retainer 30'. A rocker arm 34' operatively engages a top end 32' of the valve stem 20' and is pivotally supported by a valve lash adjustor 36'. An exhaust cam shaft 38' includes a lobe 40' which engages and displaces the rocker arm 34' to actuate the valve 16', as shown in FIG. 1. In typical fashion, the return spring 28' returns the valve 16' to a closed position as the lobe 40' rotates away from the rocker arm 34'.

A spark plug 44 includes an electrode end extending through the roof 14 of the compression chamber for igniting the compressed air/fuel mixture therein. A valve cover 46 provides a protective enclosure for the cylinder head 10, with a gasket 47 providing a sealed interface at the common juncture therebetween.

Figure 2:
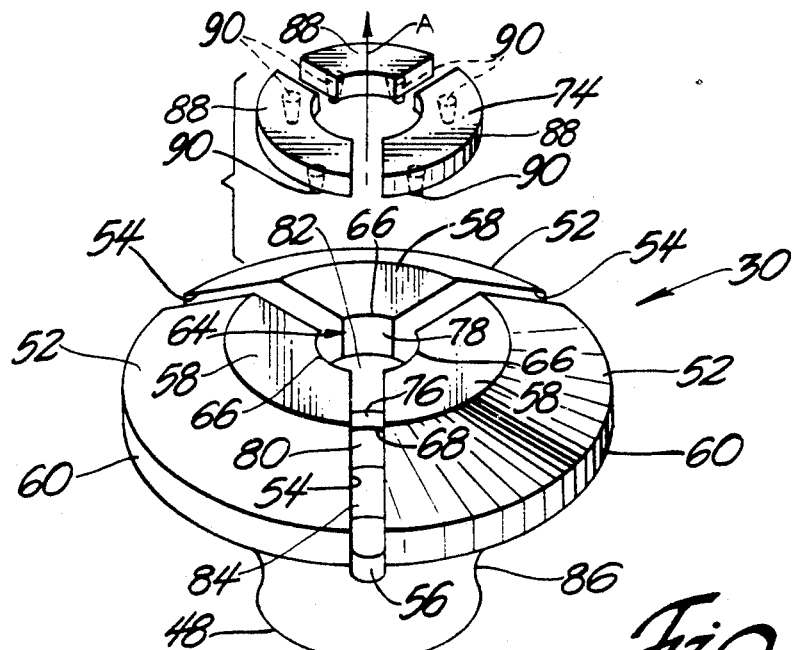
FIG. 2 is a perspective view of a self-locking valve spring retainer according to the subject invention.
Figure 3:
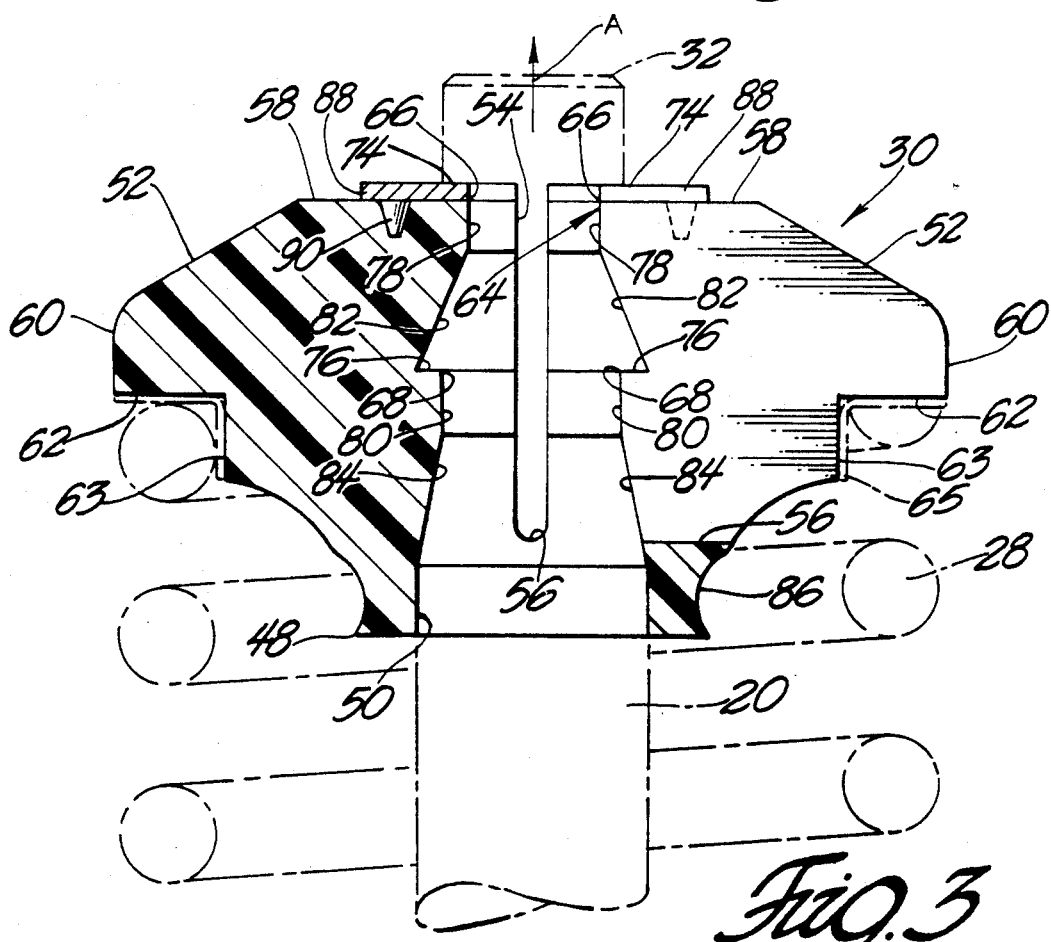
FIG. 3 is a cross-sectional view of a self-locking valve spring retainer according to the subject invention.
Figure 4:
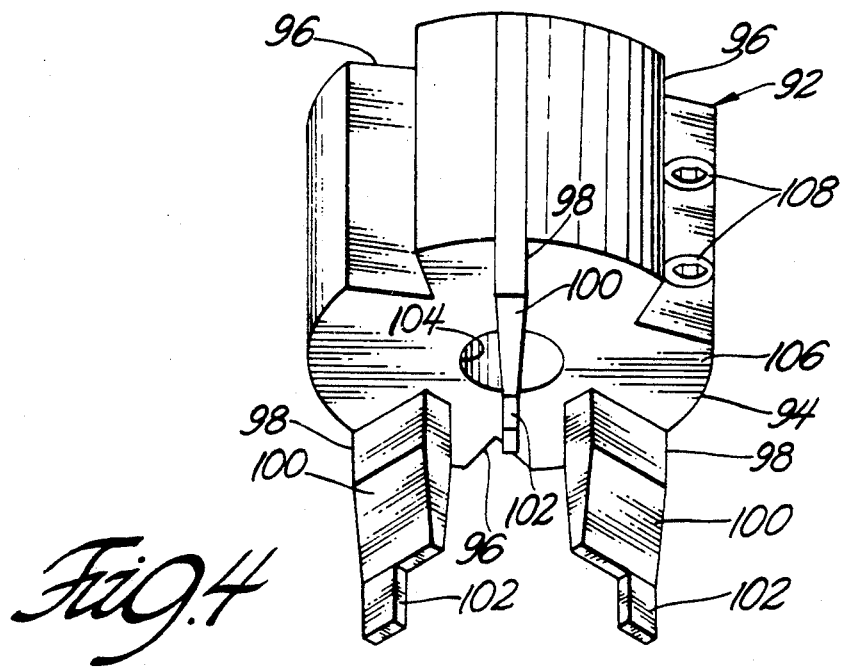
FIG. 4 is a perspective view of a handling tool according to the subject invention.

Referring now to FIGS. 2 and 3, the subject self-locking valve spring retainer 30 is shown independently and is of the type for operatively retaining a return spring 28 on the stem 20 of a poppet valve 16. The subject retainer 30 comprises an annular base ring 48 for contiguously surrounding the valve stem 20. The base ring 48 has a substantially cylindrical inner periphery defining a bottom portion of a stem passage 50 having a vertical central axis A. Preferably, the inner periphery of the base ring 48 is dimensioned to tightly, i.e., frictionally, engage about the valve stem 20 to provide a preliminary oil seal thereby preventing at least a portion of the circulated lubricating oil from dripping down the stem 20 onto the valve guide 24. The central axis A coincides with the natural axis of the valve 16 when the retainer 30 is operatively connected to the upper end of the valve stem 20.

A plurality of arms 52 extend in cantilever fashion from the base ring 48 for flexing outwardly from the base ring 48 as the retainer 30 is pressed over the top end 32 of the valve stem 20 to its operative position. The subject retainer 30 is shown in the operative position on the valve stem 20 in FIGS. 1 and 5. The arms 52 extend axially from the base ring 48 and flex radially outwardly from the central axis A upon insertion over the top end 32 of the valve stem 20. In the preferred embodiment illustrated in the Figures, there are three arms 52 disposed equally about the base ring 48. Therefore, the arms each sweep an arc of approximately 120°. An expansion slot 54 separates each adjacent pair of arms 52 and has a bottom 56 terminating at the base ring 48. The three expansion slots 54 radiate straight from the stem passage 50 outwardly to the exterior periphery of the arms 52.

Referring now to FIG. 3, each of the arms 52 are shown to include an upper surface 58 disposed in a plane generally perpendicular to the central axis A. Each arm 52 extends radially outwardly along the upper surface 50 to an arcuate flange 60. Each of the three flanges 60 are aligned in a common horizontal plane and describe a single generally angular flange soffit 62 interrupted only by the three expansion slots 54. A substantially axially extending arcuate pilot surface 63 depends from each of the flange soffits 62. The flanges 60 are provided for engaging the return spring 28. As shown in FIG. 3, the return spring 28 engages the flange soffits 62 and snugly encircles the pilot surfaces 63 when the retainer 30 is disposed in the operative position. Because of the snug, encircling fit of the return spring 28 about the pilot surfaces 63, the retainer 30 remains effectively locked on the end of the valve stem 20 while in the operative position. In some cases, an L-shaped washer 65 may be disposed over the top of the return spring 28 to provide a better contact surface between the return spring 28 and flange 60, as shown in phantom in FIG. 3.

A self-locking means, generally indicated at 64 in FIG. 3, extends inwardly from each of the arms 52 for automatically engaging and gripping the valve stem 20 when the retainer 30 is disposed in the operative position. That is, as the retainer 30 is pressed over the top end 32 of the valve stem 20, the self-locking means 64 is positioned on the radially inward surface of each of the arms 52 and poised to automatically engage and grip the valve stem 20 once the retainer 30 has reached the operative position on the valve 16.

More specifically, the self-locking means 64 comprises two axially spaced locking steps 66, 68 projecting radially inwardly from each of the arms 52 for automatically engaging and interlocking with two mating projections 70, 72, respectively, on the valve stem 20 to decrease the concentration of shear stresses within the retainer 30. The subject invention comprises two axially spaced locking steps 66, 68 which decrease by one half the shear stresses created in each locking step 66, 68 during operation.

An uppermost locking step 66 is formed coextensively along the upper surface 58 of each of the arms 52, whereas the lowermost locking step 68 is formed generally mid way between the upper surface 58 and the bottom 56 of the expansion spots 54. Each locking step 66, 68 includes an arcuate ledge 74, 76, respectively, disposed in a plane generally perpendicular to the central axis A. The ledge 74 of the uppermost locking step 66 is formed coincidentally with the upper surface 58 of the arms 52 so that the uppermost projection 70 of the valve stem 20 abuts the upper surface 58 of each arm 52 (not shown due to the improved embodiment utilizing anti-wear plates 88, described below). The locking steps 66, 68 also include a semi-cylindrical shank portion 78, 80, respectively, extending axially downwardly from a radially inward edge of each of the respective ledges 74, 76. A frustoconical relief 82 extends from the shank portion 78 to the radially outward edge of the ledge 76 of the lowermost locking step 68. Similarly, a frustoconical relief 84 extends from the bottom of the shank portion 80 to the inner periphery of the base ring 48.

Hence, the stem passage 50 comprises those portions of the inner periphery of the base ring 48, the relief 84, the shank portion 80, the relief 82, and the shank portion 78. The shank portions 78 of each of the uppermost locking steps 68 are disposed proximate the central axis A, and the shank portions 80 of the lowermost locking steps 68 are disposed distal the central axis A. Therefore, as shown in FIG. 3, the diametral distance between the upper shank portions 78 is less than the diametral distance between the lower shank portions 80. The stem 20 of the valve 16 is shaped in a precisely corresponding manner to the stem passage 50 so that upon reaching the operative position, the locking steps 66, 68 snap into position to fully contiguously grip the valve stem 20.

As the retainer 30 is pressed over the top end 32 of the valve stem 20, before reaching the operative position, the arms 52 are forced to flex outwardly from the base ring 48 due to the relatively large diameter of the top end 32 of the valve stem 20 passing through the relief 84, the reduced diameter of the shank portion 80, the relief 82, and the shank portion 78. This outward flexure of the arms 52 is referred to as blossoming because the retainer 30 appears to expand outwardly in much the same manner as a blossoming flower. Because the three arms 52 are joined together only by the annular base ring 48, all of the bending moments created during blossoming are resisted within the base ring 48.

In order to reduce the stresses on the base ring 48 during blossoming, the subject retainer 30 provides a waisted hinge 86 disposed in the base ring 48 for establishing a definite hinge location between each of the arms 52 and the base ring 48 to thereby reduce stress in the base ring 48 as the arms 52 are flexed outwardly, i.e., blossomed, over the valve stem 20 during installation and removal of the retainer 30. More particularly, the waisted hinge 86 is disposed about the exterior periphery of the base ring 48 so as not to interfere or interrupt the stem passage 50. The waisted hinge 86 is disposed annularly and concentrically about the base ring 48 in a horizontal plane generally perpendicular to the central axis A to describe a single generally annular groove just below the bottoms 56 of the expansion slots 54. Hence, the expansion slots 54 extend downwardly to just above the waisted hinge 86 and do not interrupt the waisted hinge 86 from forming one continuous annular groove. The waisted hinge 86 is best illustrated in FIG. 3 as a scalloped, or radiused, impression in the exterior surface of the base ring 48. That is, the waisted hinge 86 has a middle portion which is narrower than either of the ends of the base ring 48. Hence, the narrow middle portion has a smaller external diameter than any other portion of the base ring 48. The waisted hinge 86 permits the subject retainer 30 to be removed and reinstalled onto the valve 16 several times and in cold weather without creating stress fractures in either the base ring 48 or the arms 52.

Preferably, the subject retainer 30 is manufactured from an injection molded plastic material which may or may not be reinforced with composite fibers, such as DuPont Zytel, to produce a consistent material throughout the entire device. In order to increase the operational longevity of the retainer 30, an anti-wear plate 88 is secured to the ledge 74 of the uppermost locking step 68, i.e., the upper surface 58 of each of the arms 52, and is fabricated from a dissimilar and harder material than the plastic locking steps 66 for forming a durable interface between the valve stem 20 and each of the locking steps 66 to better distribute the shear forces throughout the arms 52 and thereby extend the operative life of the retainer 30. Preferably, the anti-wear plates 88 are fabricated from a metallic substance substantially harder than the remainder of the retainer 30. A carburized steel has been found to provide satisfactory results for the anti-wear plates 88. Each of the anti-wear plates 88 have a somewhat arcuate or annularly segmented shape extending radially from the shank portions 78 of the uppermost locking step 66 to a radially outward edge within the field of the upper surface 58. Hence, because there are three arms 52, there are three arcuate anti-wear plates 88.

Each of the anti-wear plates 88 are secured by one, and preferably two, anchors 90 extending downwardly therefrom and securely embedded below the upper surface 58 of each respective arms 52. The anchors 90 are cleat-like members attached to the retainer 30 during the manufacturing process. Alternatively, the anchors 90 may be formed by simple pins driven through a provided hole in the anti-wear plate 88 like a nail and subsequently peened over. Or, the anti-wear plates 88 may be secured to the retainer 30 by an adhesive or molded in place during injection molding of the retainer 30.

Referring now to FIGS. 4-7, a handling tool, generally indicated at 92, is provided for installing and removing the self-locking valve spring retainer 30 clamped on a poppet valve stem 20 by the assistance of a return spring 28. The handling tool comprises a metallic guide body 94 having a substantially cylindrical surface interrupted by three 90° notches 96. A release means 98 extends from the guide body 94 for releasably securing the retainer 30 relative to the guide body 94. More particularly, the release means 98 comprises a plurality of sheet-like prongs depending from the guide body 94 and having a generally wedge-shaped profile 100 insertable into the expansion slots 54 of the retainer 30 for expanding, or blossoming, the retainer 30 about the valve stem 20. Hence, the frictional wedge-fit of the prongs into the expansion slots 54 releasably holds the retainer 30 onto the handling tool 92. The three prongs are spaced in equal angular increments of 120°, on center, about the guide body 94 and radiate in respective planes intersecting the central axis A when aligned with the retainer 30.

Figure 5:
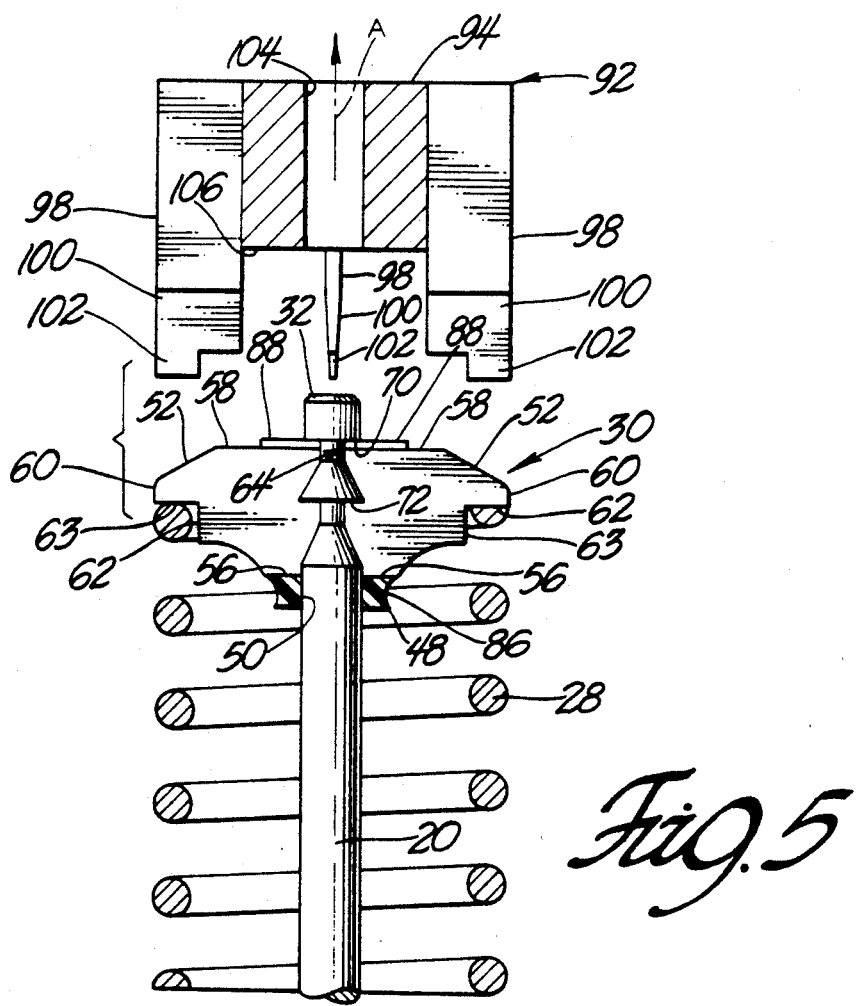
FIG. 5 is a side view in partial cross section of a valve stem, return spring, and self-locking valve spring retainer according to the subject invention with a handling tool according to the subject invention poised thereover.

The handling tool 92 further includes a spacer means 102 which extends from the guide body 94 for engaging the return spring 28 and maintaining the return spring 28 spaced from the retainer 30 prior to the release means 98 fully unlocking the retainer 30 to prevent interference from the return spring 28 and to permit rapid removal of the retainer 30 from the valve stem 20. The spacer means 102 extends integrally from the release means 98 and preferably comprises a small rectangular member depending from each of the wedges 100. Hence, as shown in FIGS. 5, 6, and 7, as the handling tool 92 is moved downwardly along the central axis A and the wedges 100 are inserted within the corresponding expansion slots 54, the spacer means 102 engages the uppermost edge of the return spring 28 and forces the return spring 28 to disengage from the flange 60, thereby preventing the return spring 28 from urging the arms 52 into tighter interlocking engagement with the valve stem 28.

The spacer means 102 must displace the uppermost end of the return spring 28 fully below the pilot surface 63 prior to the wedges 100 expanding the arms 52. This is because the coils of the return spring 28 snugly encircle the pilot surfaces 63 in a cuffing manner and, if not displaced below the pilot surfaces 63 prior to blossoming, would completely prevent outward flexure of the arms 52. Hence, the retainer 30 would be difficult to install and nearly impossible to remove intact without the spacer means 102. However, it is not only the encircling aspect of the return spring 28 about the pilot surfaces 63 which frustrates installation and removal of the retainer 30, but also the bending moment created in each arm 52 by the return spring 28 urging inward flexure of the arms 52. That is, because the return spring 28 engages the flange 60 of each arm 52, which flange 60 is offset from the hinged attachment to the base ring 48, a bending moment, or torque, is established tending to force the locking steps 66, 68 into tighter engagement with the valve stem 20. Of course, this is to the retainer's 30 advantage during operation, but something which must be overcome during installation and removal of the retainer 30.

The spacer means 102 provides the necessary action to overcome the bending moment created by the return spring 28 because the spacer means 102 moves the return spring 28 completely away from the retainer 30. Once the return spring 28 has been displaced below the pilot surfaces 63, the release means 98 may continue to expand, or blossom, the retainer 30 until the locking steps 66, 68 are fully separated from the corresponding projections 70, 72 of the valve stem 20, as shown in FIG. 6. When this complete, the retainer 30 along with the handling tool 92 may be removed completely from the valve stem 20, as shown in FIG. 7.

Figure 6:
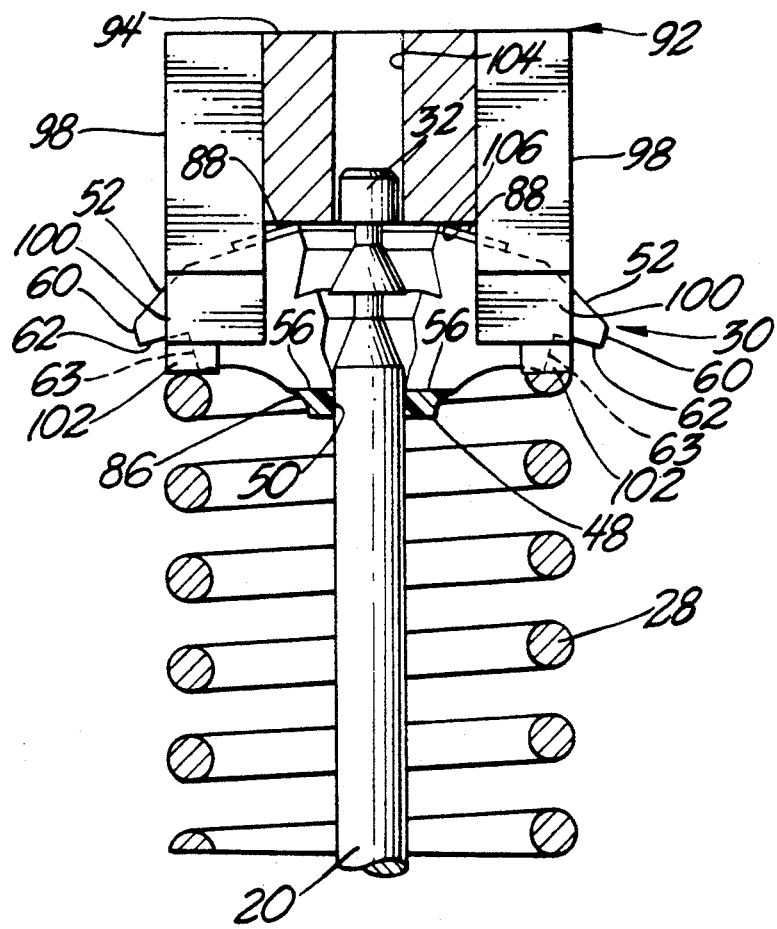
FIG. 6 is a side view as in FIG. 5 showing the handling tool fully engaged with the self-locking valve spring retainer.
Figure 7:
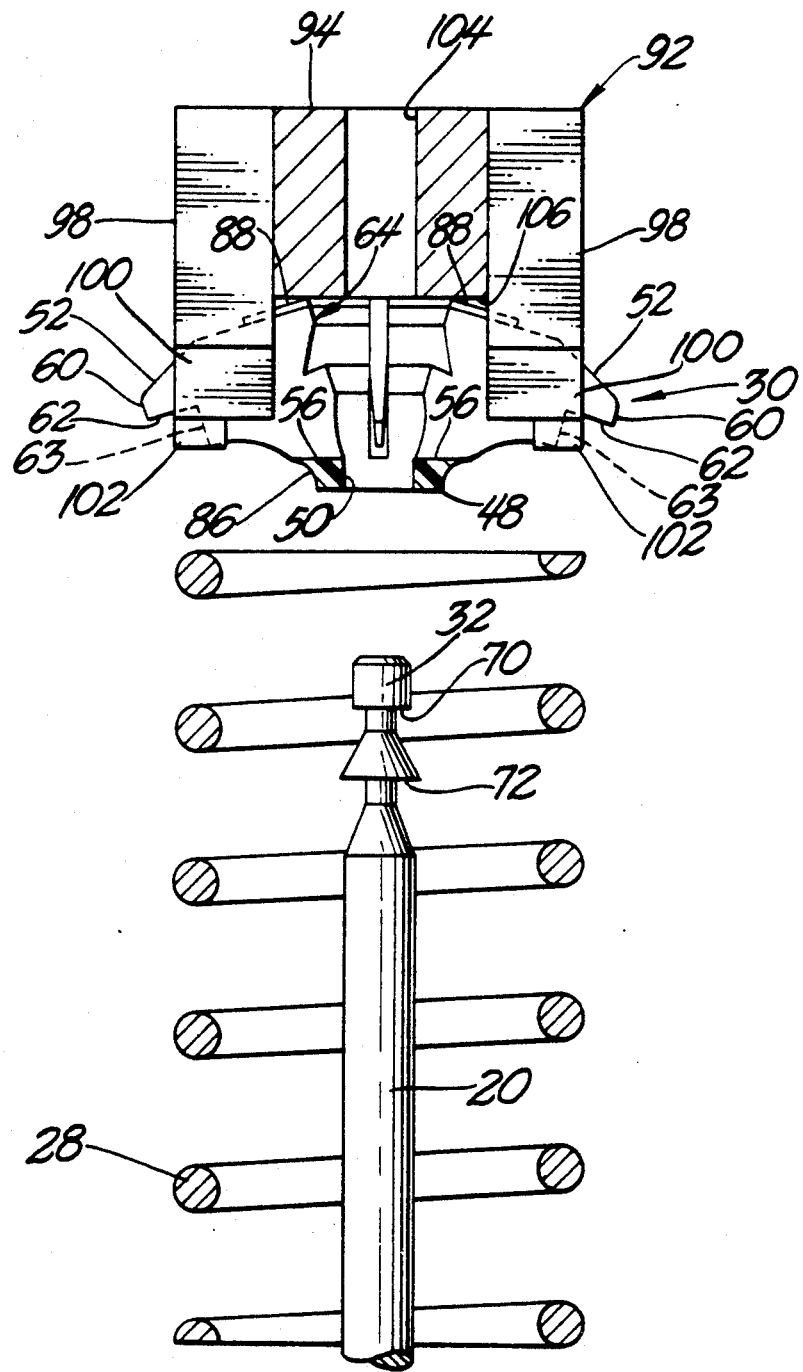
FIG. 7 is a side view as in FIG. 6 showing the handling tool and the self-locking valve spring retainer disengaged from the valve stem and return spring.

The guide body 94 includes a stem bore 104 for receiving the top end 32 of the valve stem 20 and maintaining the handling tool 92 at a centered relationship about the retainer 30, as shown in FIG. 6. The guide body 94 also includes a lower abutment surface 106 for engaging the anti-wear plates 88 of the retainer 30, as shown in FIG. 6. Therefore, when employed to install or remove the retainer 30, the handling tool 92 is inserted so that the prongs of the release means 98 extend into each of the expansion slots 54 and are inserted until the lower abutment surface 106 contacts the anti-wear plates 88 of the retainer 30.

A pair of set screws 108 (FIG. 4) are disposed in each of the notches 96 of the guide body 94 for engaging each of the prongs of the release means 98 and securely retaining the prongs in place in the guide body 94 while the handling tool 92 is operated to install or remove a retainer 30.

In FIGS. 5-7, the handling tool 92 is shown operated to remove a retainer 30 from a valve stem 20. During this operation, the release means 98 must blossom the retainer 30 sufficiently so that the locking steps 66, 68 are fully disengaged and cleared from the corresponding projections 70, 72 on the valve stem 20. This extreme blossom of the retainer 30 is required during the removal process only. When installing a retainer 30 on a valve stem 20, the retainer 30 need not be pre-blossomed as much, or theoretically, not pre-blossomed at all. Accordingly, for installation purposes, the release means 98 may comprise prongs having thinner wedge-shaped portions 100 than those required for the removal process. The set screws 108 facilitate interchange of different size prongs for installation or removal. The spacer means 102, nevertheless, is still required during the installation procedure to maintain the return spring 28 spaced from the flange 60 of the retainer 30 so that the return spring 28 does not attempt to flex the arms 52 inwardly prior to the retainer 30 being positioned in the operative position on the valve stem 20, as described above. Therefore, during installation, the handling tool 92 is particularly required to maintain the return spring 28 spaced from the flanges 60 and pilot surfaces 63 of the retainer 30, with the self-locking means 64 locking itself to the valve stem 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A self-locking valve spring retainer (30) for operatively retaining a return spring (28) on the stem (20) of a poppet valve (18), said retainer (30) comprising:
    an annular base ring (48) for surrounding a valve stem (20);
    a plurality of arms (52) extending in cantilever fashion from said base ring (48) for resiliently flexing outwardly from said base ring (48) as said retainer (30) is pressed over the end of the valve stem (20) to an operative position;
    self-locking means (64) extending inwardly from each of said arms (52) for automatically engaging and gripping the valve stem (20) when in the operative position;
    and characterized by a wasted hinge (86) formed as a scalloped impression in said base ring (48) for establishing a definite hinge location between each of said arms (52) and said base ring (48) to reduce stress in said base ring (48) as said arms (52) are flexed outwardly from the valve stem (20) during installation and removal of said retainer (30).

2. A retainer (30) as set forth in claim 1 further characterized by an expansion slot (54) separating each adjacent pair of said arms (52) and having a bottom (56) terminating adjacent said base ring (48).

3. A retainer (30) as set forth in claim 2 further characterized by said waisted hinge (86) being disposed about the exterior periphery of said base ring (48).

4. A retainer (30) as set forth in claim 3 further characterized by said waisted hinge (86) being disposed annularly and concentrically about said base ring (48) to describe a single generally annular groove.

5. A retainer (30) as set forth in claim 4 further characterized by each of said arms (52) including an arcuate flange (60) for engaging the return spring (28), with each of said flanges (60) aligned in a horizontal plane to describe a single generally annular flange soffit (62) interrupted by said expansion slots (54).

6. A retainer (30) as set forth in claim 5 wherein said retainer (30) includes a central axis (A), further characterized by three of said arms (52) separated by three of said expansion slots (54) spaced in equal arcuate increments about said central axis (A).

7. A retainer (30) as set forth in claim 6 further characterized by said self-locking means (64) comprising at least one inwardly extending step (66, 68) disposed for engaging and interlocking with a correspondingly shaped valve stem (20).

8. A self-locking valve spring retainer (30) for operatively retaining a return spring (28) on the stem (20) of a poppet valve (16), said retainer (30) comprising:
    a central axis (A);
    an annular base ring (48) having a substantially cylindrical inner periphery defining an axially extending stem passage (50) for surrounding the valve stem (20);
    a plurality of arms (52) extending in cantilever fashion axially from said base ring (48) and surrounding said stem passage (50) for flexing outwardly from said base ring (48) as said retainer (30) is pressed over the end of the valve stem (20) to an operative position;
    and characterized by two axially spaced locking steps (66, 68) projecting radially inwardly from each of said arms (52) for automatically engaging and interlocking with two mating projections (70, 72) on the valve stem (20) to decrease the concentration of shear stresses within said retainer (30).

9. A retainer (30) as set forth in claim 8 further characterized by said locking steps (66, 68) each including an arcuate ledge (74, 76) disposed in a plane generally perpendicular to said central axis (A), and a semi-cylindrical shank portion (78, 80) extending axially downwardly from a radially inward edge of said ledge (74, 76).

10. A retainer (30) as set forth in claim 9 wherein said arms (52) include an upper surface (58) and said two locking steps (66, 68) comprising an uppermost locking step (66) and a lowermost locking step (68), further characterized by each of said ledges (74) of said uppermost locking steps (66) being formed coextensively along said upper surface (58) of said respective arms (52).

11. A retainer (30) as set forth in claim 10 further characterized by said shank portion (78) of each of said uppermost locking steps (66) being disposed proximal said central axis (A) and said shank portions (80) of each of said lowermost locking steps (68) being disposed distal said central axis (A).

12. A self-locking valve spring retainer (30) for operatively retaining a return spring (28) on the stem (20) of a poppet valve (16), said retainer (30) comprising:
    an annular base ring (48) having a substantially cylindrical inner periphery defining a stem passage (50) for surrounding a valve stem (20);
    a plurality of arms (52) extending in cantilever fashion from said base ring (48) and surrounding said stem passage (50) for flexing outwardly from said base ring (48) as said retainer (30) is pressed over the end of the valve stem (20) to an operative position;
    a locking step (66) projecting radially inwardly from each of said arms (52) for automatically engaging and interlocking with a mating projection (70) on the valve stem (20) when in the operative position;
    and characterized by an anti-wear plate (88) secured to each of said locking steps (66) and fabricated from a dissimilar and harder material than said locking steps (66) for forming a durable interface between the valve stem (20) and each of said locking steps (66) to better distribute shear forces throughout said arms (52) and thereby extend the operative life of said retainer (30).

13. A retainer as set forth in claim 12 wherein a central axis (A) extends centrally through said stem passage (50) and said arms (52) each include an upper surface (58), further characterized by said locking steps (66) each including an arcuate ledge (74) disposed in a plane generally perpendicular to said central axis (A) and formed coextensively along said upper surface (58) of said respective arms (52) such that said anti-wear plates

(88) are respectively disposed over said upper surfaces (58) of said arms (52).

14. A retainer (30) as set forth in claim 13 further characterized by each of said anti-wear plates (88) including an anchor (90) extending downwardly therefrom and securely embedded below the upper surface (58) of said respective arms (52).

15. A retainer (30) as set forth in claim 14 further characterized by three of said arms (52) and three corresponding of said anti-wear plates (88).

* * * * *